FIG. 7

INVENTOR.
JOSEPH D. BIELINSKI
GEORGE D. BIELINSKI
BY
Wheeler, Wheeler & Wheeler
ATTORNEYS Jan. 15, 1963 J. D. BIELINSKI ETAL 3,073,444
BOTTLE INSPECTION AND DETECTING METHOD AND APPARATUS
Filed July 13, 1955 5 Sheets-Sheet 4

INVENTOR.
JOSEPH D. BIELINSKI
GEORGE D. BIELINSKI
BY
Wheeler, Wheeler & Wheeler
ATTORNEYS.

Jan. 15, 1963   J. D. BIELINSKI ETAL   3,073,444
BOTTLE INSPECTION AND DETECTING METHOD AND APPARATUS
Filed July 13, 1955   5 Sheets-Sheet 5

FIG.10

INVENTOR.
JOSEPH D. BIELINSKI
GEORGE D. BIELINSKI
BY
Wheeler, Wheeler & Wheeler
ATTORNEYS.

United States Patent Office 3,073,444
Patented Jan. 15, 1963

3,073,444
BOTTLE INSPECTION AND DETECTING METHOD AND APPARATUS
Joseph D. Bielinski, 2463 N. 1st St., and George D. Bielinski, 3336 N. 16th St., both of Milwaukee, Wis.
Filed July 13, 1955, Ser. No. 521,814
30 Claims. (Cl. 209—74)

This invention relates to a bottle inspection and detecting method and apparatus.

Bottle "smashes" are common occurrences in high speed apparatus for filling and capping bottles of the type used in breweries, soft drink bottling plants, milk bottling plants, etc. The problem is particularly acute in breweries and the description will proceed with specific reference to the brewery problem, although the invention has utility in any field in which high speed machinery is used to fill and cap bottles. The invention also has utility in the art of filling medical ampules, etc., in which contamination of the product is intolerable.

On the average only a small percentage of the bottles processed on brewery machines will smash. It is estimated that normal bottle smashes average about one tenth of one percent. However, in a plant processing tens of thousands of bottles per day, the total number of bottles smashed per day may be substantial. A bottle smash in the filling machine is caused primarily by thermal shock. The bottles are normally fed to a bottle filling machine from a washing and soaking machine which heats the bottles to sterilizing temperature. The beverage in the filling machine, however, is usually maintained at a very low temperature, normally just above its freezing point. Accordingly, when the cold beverage impinges against the hot bottle, the bottle may smash due to thermal shock.

Another cause of bottle smashes in the filling machine is bottle imperfections. Some bottles have weak seams or other manufacturing defects. Such bottles are more readily subject to breakage than perfect bottles.

Bottles may also be broken in the crowner machine which applies the crown cap to the filled bottle. The filled bottle may be misaligned in the crowner or it may be mis-shapen or for some other reason be subject to uneven pressure when the crown cap is pressed against the bottle crown.

When a bottle is smashed, either in the filler or the crowner, slivers of glass are deposited on parts of the machine at the station occupied by the smashed bottle. Unless these slivers are removed succeeding bottles filled or crowned at the contaminated station may be contaminated by such slivers and render the bottle contents unsafe for consumption. In this description succeeding bottles filled or capped at a contaminated station are termed "replacement bottles."

Fillers and crowners are conventionally of the multi-station type. A filler typically has fifty stations. A crowner will typically have somewhere between eight and twelve stations.

Present day bottling procedures in bottling plants are ineffective to assure removal of contaminating glass slivers from fillers and crowners after a bottle smash. Present day procedures known to me rely entirely upon human inspection and intervention to de-contaminate the machine. Human error, unfortunately, results in passage of contaminated bottles into trade channels.

The present invention provides an entirely automatic method and apparatus for de-contaminating the machine. In the present invention the machine continues to operate at normal speed after a bottle smash. However, the first and any optional number of succeeding replacement bottles processed through the contaminated station are automatically and indiscriminately ejected, thus clearing the machine of contamination.

The smashed bottle, of course, never gets into trade channels and is not a problem. It simply falls to the floor or is manually removed from the machine and is ultimately swept up. However, the first and even the second replacement bottle treated at the contaminated station may receive fine slivers of glass deposited on the station as a result of the previous bottle smash. In the filler the slivers adhering to the filler stem are flushed into the replacement bottle by incoming stream of beverage. In the crowner the glass slivers may be imbedded in the crown cap gasket in the crowning operation, or be pushed thereby into the replacement bottle by action of the crowning head. Such glass particles as may thus enter the bottle are a serious hazard.

It is usually a simple matter to visually detect glass slivers present in the first replacement bottle coming from the filler as such glass slivers are the focal points about which the incoming beverage will bubble. If the beverage contains gas, beer for example, the first replacement bottle will usually not fill beyond the halfway point because because of gas pressure developed by the bubbles formed in the bottle. The half-filled bottle can be rejected manually and will be rejected automatically according to our method and by the apparatus of our invention.

Where the incoming beverage does not contain gas, certain soft drinks for example, the first replacement bottle will fill completely and the presence of glass slivers therein is not apparent to the eye. According to our method and apparatus, however, the first replacement bottle is automatically rejected regardless of the specific beverage fill.

Even where the beverage fill contains gas, the second replacement bottle does not show any physical evidence of contamination because slivers of glass which remain after the first replacement bottle has passed through the contaminated station are so tiny they do not provide a focal point for initiation of bubbling. Accordingly, visual detection of the second replacement bottle is not possible.

In the device of our invention, however, the second replacement bottle is also automatically ejected. The third and subsequent replacement bottles could be ejected if desired but normally ejection of the first two replacement bottles will completely de-contaminate the contaminated station.

The method and device of our invention eliminates all possibility for human error in removing replacement bottles. Specifically, our apparatus includes memory circuits which will record information as to the identity of the contaminated station and the indexed advance of the machine beyond the contaminated station. Accordingly, when the machine has advanced a replacement bottle to a position opposite an ejector, the ejector will be automatically actuated. The memory circuits retain data so that the machine may be shut down for a period of time and then restarted again without cancelling the data stored by the memory circuits. Notwithstanding the shut-down, the device will resume operation and continue to log the replacement bottles and will automatically eject such bottles as they pass the ejector mechanism.

In the foregoing manner, our invention clears the filler machine of contamination by ejecting the bottles into which glass slivers are flushed by the stream of incoming beverage. The crowner machine is cleared of contamination by ejecting the bottles into which glass slivers are mechanically deposited in the course of crowner operation.

Other advantages and features of the invention will be more apparent upon examination of the following disclosure in which.

Figure 1:
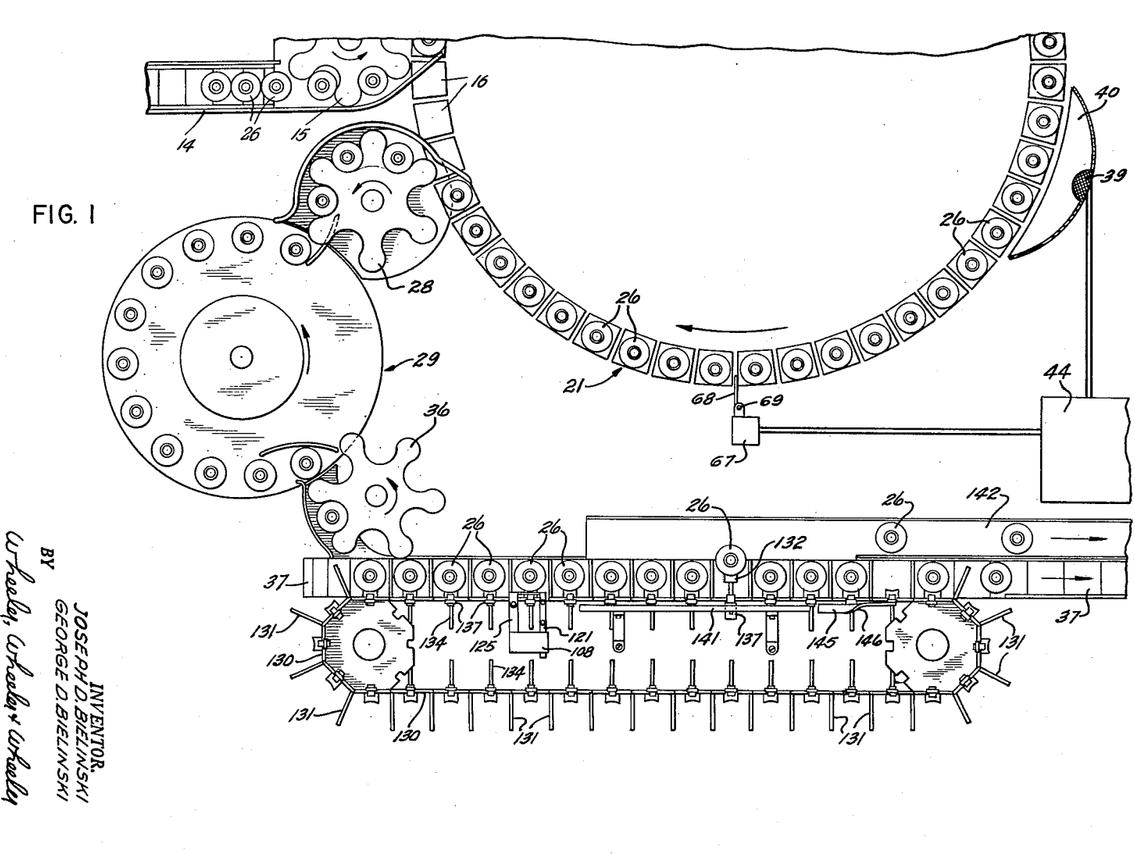
FIG. 1 is a diagrammatic plan view of a filler, crowner, intermediate star wheels and ejecting apparatus exemplifying the invention.

Referring first to the diagrammatic view in FIG. 1, an input conveyor 14 and star wheel 15 supply empty beverage bottles 26 to the stations 16 of a conventional multiple station bottle filling machine 21. Each station 16 is substantially identical with the typical station shown in FIGS. 2 through 4. Each station comprises a filling tube 22 on which a cap bell 23 is vertically slidable from its uppermost position shown in FIG. 2 to its lowermost position shown in FIG. 4. The filler tube 22 is connected to the filler frame by means of a mounting bolt 24. The tube 22 is connected by the beverage line 25 to a source of beverage under pressure.

Figure 2:
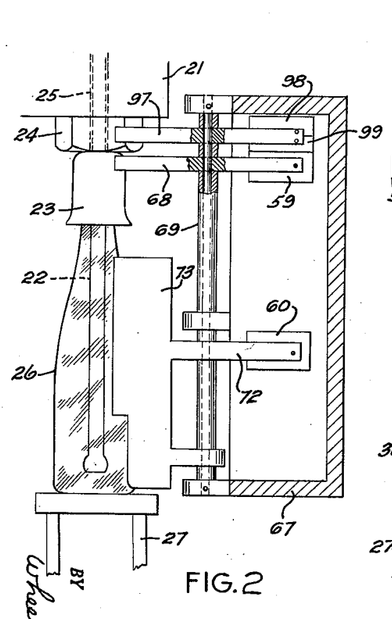
FIGS. 2, 3 and 4 are fragmentary side elevations of a single station in the multi-station filing machine and adjacent sensing mechanism, the three views showing respectively a normal bottle, smashed bottle and an empty station.

As is conventional in devices of this type, the machine has a cycle of operation in which a series of empty beverage bottles 26 are fed into the filler, the respective bottles passing over respective elevator pedestals 27 axially aligned with the filler tube 22 and provided with means for gradually lifting the bottle 26 toward the filler and to cause the filler tube 22 to telescopically enter ethe bottle as shown in FIG. 2. The crown of the bottle lifts the cap bell 23 in the course of upward movement of the bottle. When the cap bell 23 bottoms on the bolt 24 a conventional control valve (not shown) is actuated to fill the bottle through the tube 22. The bottle filling operation continues as the bottles rotate with the filling machine.

After the respective bottles are filled, their respective pedestals 27 retract vertically to clear the bottles from the filling tubes 22, the bottles being then automatically transferred to a star wheel 28 which transfers the bottles to a crowner 29 of conventional structure. The crowner is provided with multiple stations as exemplified in FIG. 12.

Figure 12:
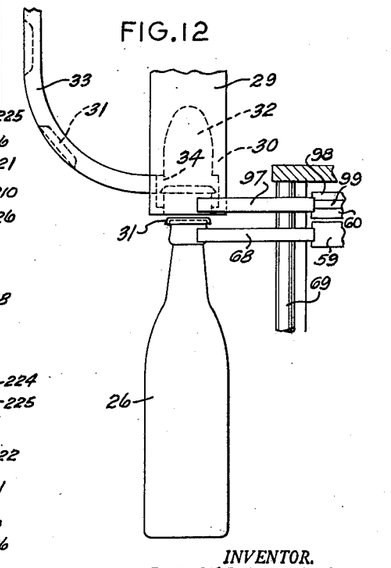
FIG. 12 is a diagrammatic elevation of a station in the crowner and adjacent sensing apparatus.

The crowner conventionally comprises heads 30 individual to the bottles 26, the heads being mounted for vertical reciprocation in the course of seating the crown caps 31 on the bottle crowns. The heads 30 are hollowed at 32. A chute 33 communicates with the hollow to conduct the crown caps 31 thereto by gravity. The heads are also provided with forming die shoulders 34 which engage the caps 31 to seal the cap rims over the bottle crowns on downward movement of the heads 30.

Crowned bottles discharged from the crowner are picked up by star wheel 36 and discharged onto a conveyor 37. In normal course the bottles are delivered to a pasteurizer (not shown) via conveyor 37.

As before indicated the device of the present invention will detect a bottle smash, whether it be in the filler or in the crowner and eject the first and second and optionally any succeeding number of replacement bottles. A smashed bottle in the filler is indicated at 38 in FIG. 3. In the course of fracture, which is really a bottle explosion, tiny slivers of glass will deposit on the various parts of the filler structure and particularly will tend to adhere to the filler tube 22 which is wet and has enough surface tension to retain fine slivers of glas. The apparatus by which any filler station contaminated by slivers of glass is detected and this information recorded and the first and second, etc., replacement bottles ejected will now be described.

Adjacent the point of bottle travel where the pedestal 27 lifts the bottle to actuate the filling valve, we dispose a microphone 39, desirably housed in a hood 40, which responds to the characteristic explosive sound of a breaking bottle. Thermal shock occurs when the cold beverage first contacts the hot bottle. Accordingly, bottle smashes will occur almost invariably opposite the microphone. For convenience of illustration, FIG. 1 shows microphone 39 somewhat remote from input conveyor 14. In actual practice it would be closer to input conveyor 14 inasmuch as in commercial embodiments of the filler machine 21, pedestal 27 lifts the bottle almost immediately after the bottle is transferred by star wheel 15 from conveyor 14 to the filler 21.

Figure 10:
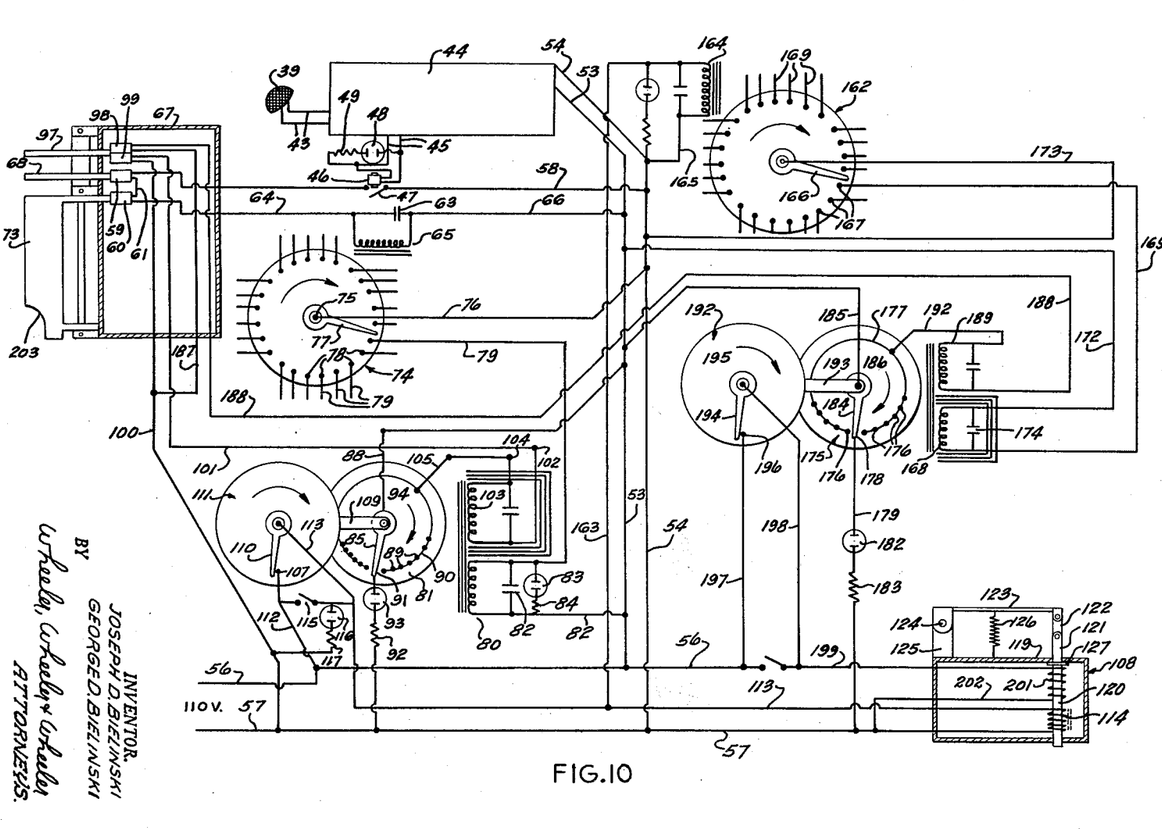
FIG. 10 is a circuit diagram for the electrical components of my invention.

With reference to the electric circuit illustrated in FIG. 10, the microphone 39 is connected by leads 43 to an amplifier 44 having outlet leads 45 connected to a relay 46 which controls switch 47. Relay 46 is of a conventional time delay type which, when once actuated, will hold switch 47 closed for a predetermined period of time which may be five seconds for a filler having fifty stations. Leads 45 also energize a lamp bulb 48 in series with resistance 49 so that the lamp bulb glows in response to the sound of a breaking bottle. Amplifier 44 receives its source of electric energy from power lines 56, 57 through branch lines 53, 54. Amplifier 44 is tuned to the characteristic explosive sound of a breaking bottle and will normally not respond to other loud noises in the bottling plant.

Switch 47 which is closed in response to the sonar detector aforesaid is in circuit with line 58 which is in series with microswitch 59, line 61, microswitch 60, line 61, line 64, relay coil 65 which is in parallel with condenser 63, and line 66. Lines 58 and 66 are connected to branch power lines 54, 53 to energize the relay coil circuit when switch 47 and both microswitches 59, 60 are closed.

As best shown in FIGS. 1 and 2, microswitches 59, 60 are mounted in a control box 67 physically disposed adjacent the periphery of filler 21 and spaced arcuately beyond the sonar detector microphone 39. Microswitch 59 is normally closed and has an actuator which responds to the pressure of feeler arm 68 which is pivotally mounted at its midpoint on pintle pin 69. Arm 68 projects into the path of bell caps 23 elevated by unbroken bottles undergoing filling. Accordingly, as the filler rotates, arm 68 will be actuated by successive bell caps to successively open the normally closed microswitch 59 as filler stations containing unbroken bottle 26 pass the control box 67.

Microswitch 60 has an actuator in the path of oscillating movement of feeler arm 72 also mounted at its midpoint on pintel pin 69. Feeler arm 72 has a broad feeler paddle 73 extending into the path of bottles positioned in the respective filler stations. Switch 60 is normally open. Accordingly, when arm 72 is succesively actuated by the pasage of bottles 26, normally open switch 60 is successively closed in timed coordination with the opening of switch 59 as aforesaid.

The apparatus just described comprises means for discriminating between stations containing unbroken and broken bottles. If an unbroken bottle is in the station opposite the control housing 67, both feeler arms 68 and 72 will be actuated simultaneously to close microswitch 60 and open microswitch 59. Thus the circuit including relay 65 will be open because switch 59 is open. After this station has passed the control box, arms 68 and 72 are biased by microswitch springs (not shown) to retracted position in which switch 59 is normally closed and switch 60 is normally open. Here again the circuit including the relay 65 is open because switch 60 is open.

However, when a broken bottle (see FIG. 3) comes opposite the control box 67, the switches are operated differently. First note that the sound of a bottle smash has been picked up by microphone 39 and time delay switch 47 closed. The broken bottle 38 will assume its position shown in FIG. 3 in which bell cap 23 has slid by gravity down stem 22 to be out of the path of feeler arm 68. Accordingly, as the station contaminated by glass slivers from broken bottle 38 sweeps past the control box 67, feeler arm 73 will be actuated by the broken bottle 38 to close the normally open microswitch 60 but feeler arm 68 will be clear of the dropped bell cap 23 and its normally closed microswitch 59 will remain closed. Since both microswitches 59 and 60 are now closed, and switch 47 is also closed, an electric pulse circuit is now complete through the relay 65 which actuates the arm 77 of master stepping relay selector switch 74 shown in FIG. 10.

Switch 74 is conventional and consists of a center contact 75 connected by line 76 to branch power line 54. About the periphery of the switch 74 are a plurality of contacts collectively identified by reference character 78. Each contact 78 is connected by its own line 79 to a solenoid coil 80 of a first stepping relay 81 and thence through line 82 to the other branch power line 53.

Master stepping relay selector switch 74 has a rotatable switch contact arm 77 which wipes across one of its peripheral contacts 78 each time it is indexed by a current pulse in its control relay 65. The sweep arm 77 does not remain on the contact 78, but simply sweeps across it to momentarily complete a circuit through the solenoid 80 of the first stepping relay 81 connected to the particular contact 78 by a particular line 79.

The circuit of FIG. 10 is fragmentary in that each contact 78 is provided with a line 79 and with a circuit including a coil 80 and a first stepping relay 81, one for each contactor 78. In the disclosed embodiment there are twenty-four contacts 78 on the master stepping relay selector switch 74. Hence there are twenty-four lines 79 and twenty-four first stepping relays 81, etc. To simplify the description of the invention, however, only one first stepping relay 81 and associated circuit components is illustrated in the drawing.

To suppress transient and surge currents in solenoid coil 80, a condenser 82 is normally connected in shunt therewith. We may also provide a pilot lamp 83 and series limit resistor 84 in circuit with lines 79, 82. The lamp 83 momentarily glows when the solenoid coil 80 is energized.

First stepping relay 81 comprises a central rotatable sweep arm 85 connected by line 88 to branch power line 53. The periphery of the stepping relay comprises a series of contacts 89 which, unlike the contacts 78 of master stepping relay selector switch 74, are all interconnected by line 90. In its normal "at rest" position, sweep arm 85 is disposed on separate contact 91 which is electrically independent of line 90 and the other contacts 89. Contact 91 simply completes a circuit through line 88, arm 85, contact 91, glow lamp 93 and resistance 92 between power lines 57 and 56. Accordingly, before sweep arm 85 is stepped to contact the first contact 89, glow lamp 93 is illuminated. Actuation of the solenoid 80 as aforesaid, however, moves sweep arm 85 in the direction of arrow 94 from contact 91 to the first of the interconnected series of contacts 89. Sweep arm 85 is then stepped automatically from one contact 89 to the next in timed coordination with the advance of bottles through the filler machine in the following manner.

Referring again to FIGS. 2, 3 and 4, pintle pin 69 is also provided with an oscillating feeler arm 97 which is oscillated about the pin by pressure of the bolt 24 on the filler 21 every time a filler station passes the control box 67. The remote end of arm 97 is provided with two actuators for two normally open microswitches 98, 99. As best shown in FIG. 10, microswitch 99 is connected by line 100 to power line 57, and by line 101 to one terminal 102 of the stepping solenoid coil 103 of the first stepping relay 81, and to similar coils on the other stepping relays not shown. The circuit is completed from the other terminal 104 of solenoid coil 103 through line 105 to line 90 which interconnects contacts 89 and through arm 85, line 88 and branch line 53 to the other power line 56. Accordingly, the circuit including coil 103 is open when first stepping relay 81 is "at rest" inasmuch as sweep arm 85 is on contact 91, electrically separate from line 90. The circuit is closed only when coil 80 is energized to step arm 85 from contact 91 to first contact 89, whereupon the arm 85 will continue to step as hereinafter explained.

Energization of coil 103 through the circuit aforesaid is effective on each current pulse caused to step sweep arm 85 from one contact 89 to the next. Microswitch 99 is continually opened and closed in timed coordination with the movement of bottles through the filler 21. For convenience we actuate arm 97 by filler bolts 24, although it is clear that arm 97 could be actuated in any other manner provided only that the microswitch 99 is actuated once for each advance of a bottle past the control box 67.

The first stepping relay 81 is provided with a total number of contacts 89 exactly equal to the number of bottles between the filler station opposite control box 67 and the ejector mechanism 108 shown in FIG. 1.

Referring now particularly to FIG. 1, it will be observed that depending upon the number of pockets in the star wheels 28, 36, the number of stations in the crowner 29 and the number of stations in the filler 21, there may be twenty-eight or thirty or some other number of bottles in the line of bottles between control box 67 and ejector 108. Accordingly, the first stepping relay 81 will be provided with exactly this number of contacts 89 plus the number of stations in the filler (normally about 50). Assuming a filler having fifty stations and twenty-eight bottles in the line of bottles between the control box 67 and ejector 108, stepping relays 81 will have seventy-eight contacts 89.

This is because the function of stepping relay 81 is to memorize or store information with respect to the number of indexing pulses which must accrue in the first stepping relay circuit, under control of microswitch 99, before ejector 108 is actuated to eject the first replacement bottle which occupies the contaminated filler station. The filler will have to make one complete revolution (this being equal to fifty pulses in solenoid 103) before the contaminated station containing the first replacement bottle again comes opposite control box 67. The first replacement bottle into which contaminating slivers of glass have been washed by the injected beverage must then proceed for an additional twenty-eight pulses of solenoid 103 (the distance between control box 67 and ejector 108) before the first replacement bottle comes opposite the ejector 108.

Mechanically coupled to the shaft of the first stepping relay 81 by cross shaft 109 is the sweep arm 110 of rejection switch 111. Sweep arm 110 thus steps with arm 85 and after seventy-eight pulses of coil 103 (in the example used) sweep arm 110 will wipe over contact 107 in the last pulse of coil 103. Contact 107 is connected by line 112 to power input line 56. The center contact of sweep arm 110 is connected by line 113 to one terminal of electromagnetic coil 114 in the ejector 108, the other terminal of coil 114 being connected to power line 57 to complete the ejection circuit. Accordingly, when sweep arm 110 in the rejection switch 111 wipes over contact 107 in the last pulse of stepping relay movement, a circuit through the electromagnetic coil 114 is momentarily completed to eject the first replacement bottle which now has come opposite ejector 108.

The last pulse of coil 103 will also move sweep arm 85 off of the last contact 89 in the first stepping relay 81 and thus break the circuit from microswitch 99 to the stepping relay solenoid 103. Sweep arm 85 will then remain on contactor 91 and re-light bulb 93 until this particular first stepping relay 81 is again actuated by the master stepping relay selector switch 74. When sweep arm 85 is on contact 91, sweep arm 110 of the rejection switch is beyond contact 107 and the circuit through electromagnetic coil 114 is thereby broken.

We may manually reject a bottle opposite ejector 108 by depressing the manual switch 115 which is in parallel with sweep arm 110. We also provide a lamp 116 in series with limit resistance 117 which glows whenever switch 115 is closed and whenever sweep arm 110 is on contact 107.

Energization of the electromagnetic coil 114 ejects bottles in the following manner. In the embodiment shown in FIGS. 1, 7 and 10, the coil 114 is wound around a solenoid armature 120. Armature 120 has an extension 121 projecting from the housing wall 119 of ejector 108. The extension 121 is pivotally connected to link 122 which is in turn pivotally connected to plate 123 which has a fixed pivotal connection at 124 to bracket 125 extending from wall 119. Plate 123 is biased to its outermost position by spring 126, the stop 127 mounted on armature 120 engaging the wall 119 to limit outward movement of the plate. When the solenoid coil 114 is energized armature 120 is drawn into the ejector housing to pivot plate 123 against the bias of spring 126.

Figure 11:
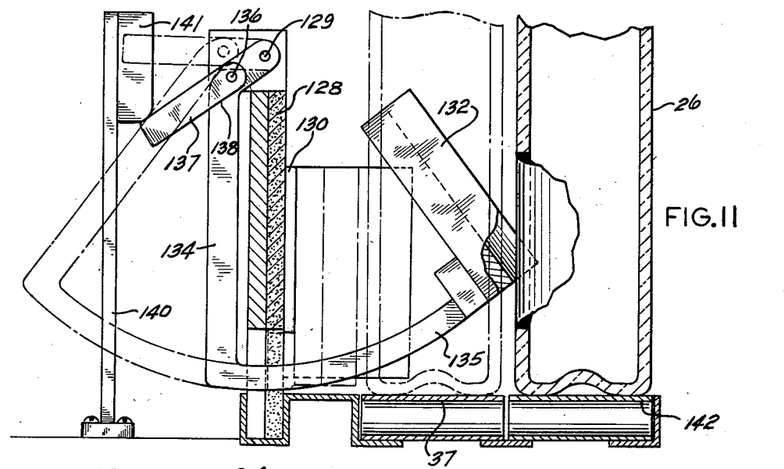
FIG. 11 is a vertical cross section, partly in elevation through the ejecting mechanism of FIG. 7, and showing in dotted and full lines respectively sequential positions of the ejector pusher and replacement bottle.

As best shown in FIG. 1, the bottles 26 are advanced from star wheel 36 onto the conveyor 37. Mounted adjacent the inner periphery of the conveyor is a segmented wall made up of links 130 secured at opposite sides of a flexible belt 128. Links 130 at one side of the belt have laterally extending partitions 131 which extend across the conveyor 37 and provide individual pockets into which the bottles are successively deposited as they leave star wheel 36. Each pocket is provided with an ejecting mechanism best shown in FIGS. 7 and 11 which comprises a pusher plate 132 which is desirably curved to match the contour of the bottles. The segments 130 are provided with upstanding bifurcated brackets 133 having cross pins 129 to which are pivoted arms 134 having curved fingers 135 connected to the pusher plates 132.

Figure 7:
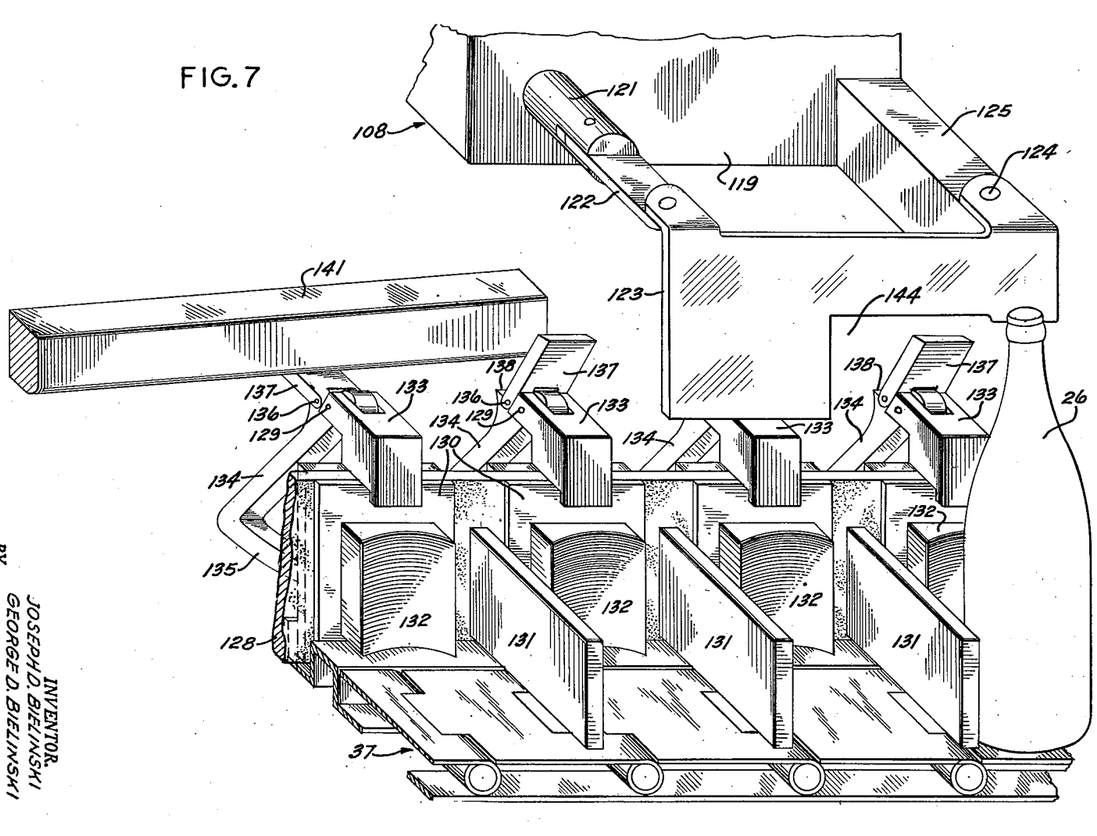
FIG. 7 is a perspective view on an enlarged scale of the ejecting apparatus of the device shown in FIG. 1.

Pivotally connected on the pins 136 to each arm is an actuator plate 137 which is normally in upright position as shown in FIG. 7. The ejector 108 is fixedly mounted within the track of the conveyor and with its ejector plate 123 normally offset from the path of travel of the upright actuator plates 137. However, when the ejector armature 120 is actuated to draw ejector plate 123 inwardly, plate 123 will tip the actuator plate 137 of the coneyor pocket opposite the ejector from upright position to a horizontal position in which it is supported on a shoulder 138 formed on the arm 134.

Actuation of the ejector armature, of course, is effected because a replacement bottle has come opposite thereto. Accordingly, the actuator plate 137 of the pocket containing the replacement bottle will be flipped over to be supported on the shoulder 138 of the arm 134.

Laterally offset from the arms 134, but aligned with actuator plates 137 which have been flipped over by the ejector plate 123, we provide a cam bar 141 which is downwardly inclined in the direction of conveyor movement. Cam bar 141 may be supported by bracket 140. Accordingly, as the conveyor proceeds along the cam bar 141, pressure of the cam bar against the flipped over actuator plate 137 will exert downward pressure on the arm 134 and cause it to swing downwardly and concurrently force the pusher plate 132 across the conveyor 37 and gradually transfer the replacement bottle 26 from the conveyor 37 into a reject conveyor lane 142 as shown in FIG. 1.

Note that the ejector plate 123 is cut out at 144 so that when the plate is oscillated about its pivot 124 to flip over the actuator plate of the conveyor pocket containing the replacement bottle, it will not engage the actuator plate on the next adjacent pocket.

Bottles which are not replacement bottles occupy pockets of the conveyor having their actuator plates 137 upright. Such actuator plates are not engaged by the ejector plate 123 and these actuator plates 137 are not engaged by the cam bar 141. Accordingly, uncontaminated bottles continue along normal lane 37.

After the replacement bottle has been ejected the actuator plate 137 previously flipped over by the ejector plate 123 is restored to upright position by curved cam rail 145 (see FIG. 1) which engages beneath the actuator plate and lifts it in the course of conveyor movement along the ram rail curve 146.

Figure 6:
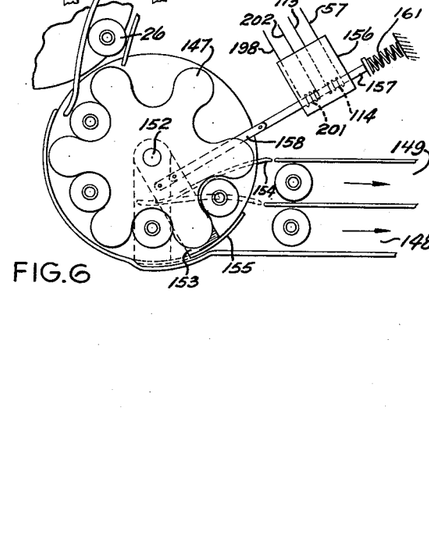
FIG. 6 is a modified embodiment of ejector mechanism shown in plan.

An alternate embodiment of apparatus for bodily moving the replacement bottle into a reject lane is shown in FIG. 6. Here the bottles are fed from star wheel 36 or from the crowner 29 to a star wheel 147 which is aligned with a normal outlet lane 148 and a reject outlet lane 149. Pivotally connected to the central axle 152 about which the star wheel rotates are top and bottom arms 153 between which is mounted a deflecting baffle 154 and a guard baffle 155. The ejector 156 has an armature 157 about which the coil 114 is wound. The armature 157 is connected by link 158 to the arms 153. With the armature 157 in its normal position a spring 161 holds the plates, baffle and guard in their full line position in which bottles are discharged through the normal outlet lane 148. However, when the coil 114 is energized, armature 157 is attracted into the ejector box 156 to shift the plates 153, baffle 154 and guard plate 155 to their dotted line positions in which the replacement bottle is directed to the rejection lane 149.

In either embodiment of the invention shown in FIGS. 1 or 6, actuation of the ejector will remove the replacement bottle from the normal course of bottle movement and transfer it to a rejection lane from which it may be discarded.

As the description has proceeded thus far the automatic operation of the device to reject the first replacement bottle has been described. As aforesaid, however, it is also desirable to reject the second replacement bottle and optionally the third or fourth replacement bottle. Normally, however, rejection of the first and second replacement bottles will completely de-contaminate the contaminated station.

Referring again to FIG. 10, energization of coil 114 to actuate the ejector mechanism 108 (or 156) triggers a second or repeater master stepping relay selector switch 162. This is because completion of the ejector circuit through lines 113 and 57 by wiping of the sweep arm 110 of rejection switch 11 across contact 107 will complete a parallel circuit through lines 113, line 163, relay 164 and line 165 back through lines 54 and 57 to the power source.

Repeater master stepping relay selector switch 162 is substantially identical with master stepping relay selector switch 74. Switch 162 has a central sweep arm 166 and a series of peripheral terminal contacts 167. Each contact 167 is individually connected to one terminal of a second stepping relay solenoid actuator coil 168 through line 169. The other terminal of coil 168 is connected through line 172 to branch power line 53. The central terminal of sweep arm 166 is connected by line 173 to branch power line 54.

As in the case of master stepping relay selector switches 74, each contact 167 of repeater master stepping relay selector switch 162 is connected by a line 169 to a separate second stepping relay 175, there being twenty-four such relays 175 in the disclosed embodiment. Every time sweep arm 166 is stepped to wipe over a contact 167, another second stepping relay is actuated or placed "in memory" by its coil 168. The stepping relay solenoid coils 168 are desirably bridged by surge suppression condensers 174 and may also be provided with pilot lights of the type shown at 83.

Each second stepping relay 175 is of substantially identical construction to the first stepping relays 81. Each is provided with a series of peripheral contacts 176 interconnected by line 177. The relay 175 also includes a neutral contact 178 from which line 179 leads through glow lamp 182 and resistance 183 to power line 57. The central contact of sweep arm 184 is connected by line 185 to branch power line 53. Accordingly, when a second stepping relay 175 is in neutral position its glow lamp 182 is illuminated. However, when the ejector 108 is actuated as aforesaid and the repeater master stepping relay selector switch 162 concurrently actuated to wipe sweep arm 166 across one of its contacts 167, solenoid coil 168 is energized to move sweep arm 184 in the direction of arrow 186 off of its contact 178 and onto the first contact in the series of contacts 176.

The sweep arm 184 of the second stepping relay 175 will then immediately begin to step in timed coordination with the movement of bottles through the machine. This is because the sensing arm 97 in control box 67 also actuates microswitch 98 connected by line 187 to power line 57 through line 100 and by line 188 to the stepping coil 189 of the second stepping relay 175. The circuit aforesaid is completed from stepping relay coil 189 through line 192 connected to the peripheral line 177 of the second stepping relay 175 and thence through sweep arm 184 and line 185 to branch power line 53. Since sensing arm 97 and microswitch 98 are actuated for each increment of filler rotation the stepping coil 189 will be pulsed to advance sweep arm 184 from one contact 176 to the next for each increment of bottle advance.

Since the second replacement bottle will be exactly fifty bottles behind the first replacement bottle (assuming this to be the number of stations in the filler), we provide fifty contacts 176 in the second stepping relay 175.

As in the case of the first stepping relay 81, we provide second stepping relay 175 with a rejection switch 192 having a sweep arm 194 mechanically coupled by shaft 193 to the sweep arm 184 of the relay 175. Thus the sweep arm 194 of the rejector switch 192 rotates in the direction of arrow 195 in step with the sweep arm 184 of the second stepping relay 175. On the fiftieth pulse in stepping coil 189 sweep arm 184 is moved from its last contact 176 to the neutral contactor 178. In this last increment of movement of sweep arm 184 the sweep arm 194 of the rejector switch 192 wipes across contact 196 to momentarily complete a circuit to the ejector 108 from power line 56, line 197, sweep arm 194, lines 198 and 199 and a second electromagnetic coil 201 wound about the armature 120 of the ejector 108, and line 202 back to power line 57. Accordingly, as sweep arm 194 wipes across contact 196 the ejector 108 is again actuated to flip over the actuator plate 137 of the pocket of conveyor 37 containing the second replacement bottle. Accordingly, in the course of continued advance of conveyor 37 the second replacement bottle will be pushed into rejection lane 142 as hereinbefore explained.

For the embodiment of FIG. 6 the armature 157 may be provided with a second coil 201 for actuation of the arms 153 in the manner hereinbefore explained, thus to reject the second replacement bottle in this embodiment of ejection apparatus.

It is clear that a third or any additional number of repeater master stepping relay selector switches and stepping relays with electromagnetic connections to the ejector could be provided, each independent memory circuit thus provided being independently triggered by the action of the ejector in ejecting a first replacement bottle.

As before indicated the circuit of FIG. 10 is simplified in that banks of first and second stepping relays with their associated equipment have been omitted. However, as many stepping relays as there are contactors 79 and 167 in their respective master stepping relay selector switches can be provided. Accordingly, it makes no difference how many bottles smashes occur in the machine as for each bottle smash the contaminated station is detected, the respective sweep arms 77 and 166 of the stepping relay selector switches 74, 162 move sequentially to a new contact 78 or 167 to initiate operation of entirely independent memory circuits which are simultaneously pulsed by the microswitches 98, 99 to actuate the ejector 108 upon arrival of the appropriate replacement bottle in a conveyor pocket opposite the ejector.

As hereinbefore indicated, temporary shut-down of the bottling equipment has no effect on the memory circuits as shut-down of the machine terminates actuation of the pulsing switches 98, 99. The respective sweep arms 85 and 184 will stop on their appropriate contacts. As the machine is re-started, the sweep arms 85 and 184 will resume where they left off and the replacement bottles will be ejected automatically.

Figure 4:
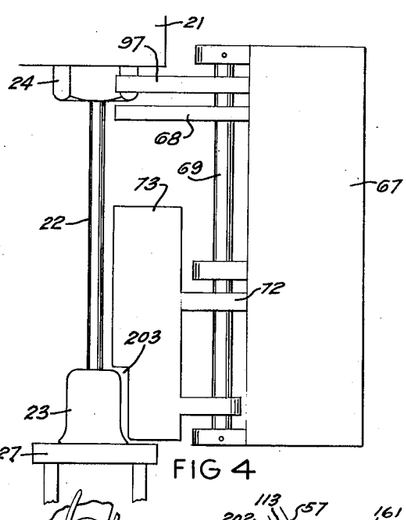
Figure 5:
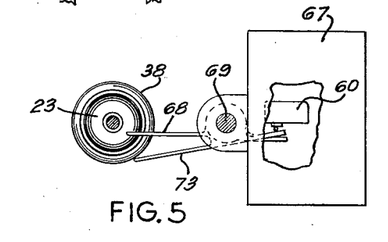
FIG. 5 is a cross sectional view taken along the line 5—5 of FIG. 3.

The sensing elements in the control box 67 are adapted to discriminate between a normal full bottle, a broken bottle and a condition in which no bottles whatever are passing through the machine. The position of the elements as shown in FIG. 4 is typical for the condition when the filler is first energized and before its stations have received bottles. Accordingly, the normally open switch 60 in series with normally closed switch 59 will not be actuated by filler rotation. Thus the circuit including the master stepping relay coil 65 will remain open and the apparatus will not be placed "in memory."

Note that the bottom portion of the blade 73 of arm 72 is cut out at 203 so that when the bell 23 descends to its lowermost position the plate 73 is not actuated.

Figure 3:
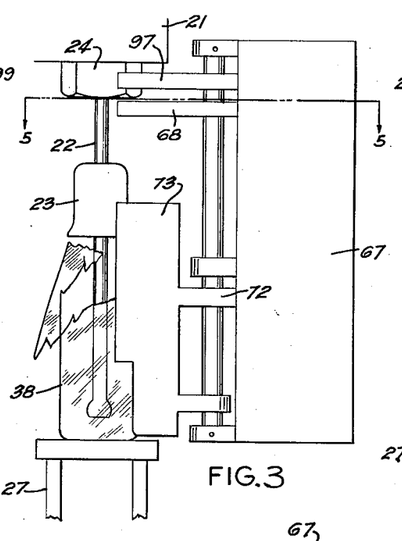

As soon as unbroken bottles start passing the control box 67 both switches 59 and 60 will simultaneously be actuated, as shown in FIG. 2. Here again the circuit including the master stepping relay coil 65 will remain open and the apparatus will not be placed "in memory." It is only if a bottle is broken, as illustrated in FIG. 3, that the series switches 59 and 69 will be simultaneously closed as the broken bottle passes the control box to complete the circuit to master stepping relay coil 65 and detect a contaminated station. Switch 59 remains closed because bell 23 has slid down stem 22. Switch 60 is closed because the base fragment 38 of the broken bottle will invariably be retained on the pedestal 27 to actuate switch control paddle 73. In this manner the sensing apparatus discriminates between conditions which should and which should not trigger the circuits.

The sonar apparatus 44, of course, also has a discriminating function in that switch 47, also in circuit with the stepping relay actuated coil 67, will not be closed unless previously actuated by the sound of a breaking bottle. In this manner all precautions are taken to insure discrimination between broken bottles, unbroken or normal bottles and a condition in which there are no bottles in the filler.

The crowner apparatus shown in FIG. 12 may be provided with a control box 67 and associated apparatus essentially the same as control box 67 shown in connection with the filling apparatus, except that microswitch 60 is mounted to be actuated by feeler arm 97 which also actuates pulsing microswitches 98, 99. The paddle 73 shown in FIGS. 2, 3 and 4 may be omitted because a crowner smash completely disintegrates the bottle and the crowner does not have a filling stem to hold broken bottle fragments in the crowner station. Accordingly, the sonar detector is solely relied upon to discriminate between conditions in which there are no bottles in the crowner and in which a crowner smash occurs.

Arm 97 for microswitches 60, 98, 99 is actuated by the crowner heads 30 which descend into the path of arm 97 in the course of capping the bottle. Arm 68 for microswitch 59 is actuated by the bottle crowns. Switch 59 is normally closed and switch 60 is normally open. Accordingly, as unbroken bottles pass the station opposite which the control box 67 is located, switches 59 and 60 are concurrently actuated in the manner previously described to keep the circuit including the coil 65 of the master stepping relay selector switch 74 open. Between stations normally open switch 60 maintains this circuit open. However, if a bottle smash occurs, arm 68 will not be actuated and actuation of arm 97 by crowner head 30 will close normally open switch 60 to pulse coil 65. The sonar detector has previously closed switch 47 in the manner previously described.

During machine starting operations, when no bottles are present in the crowner, switch 60 will be repeatedly closed as crowner heads 30 pass the control box 67. However, since there has been no crowner smash, sonar actuated switch 47 remains open to keep the detector circuit open. Accordingly, the sonar is relied upon to discriminate between conditions in which there are no bottles in the crowner and in which a bottle smash has occurred.

Figure 8:
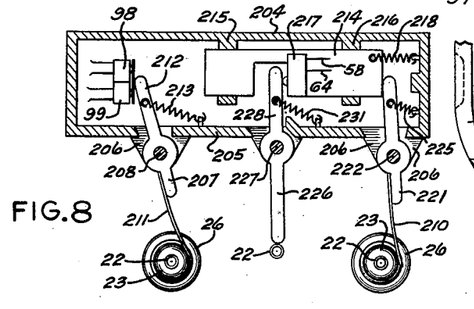
FIGS. 8 and 9 are fragmentary cross sectional views taken through a modified embodiment of sensing mechanism.
Figure 9:
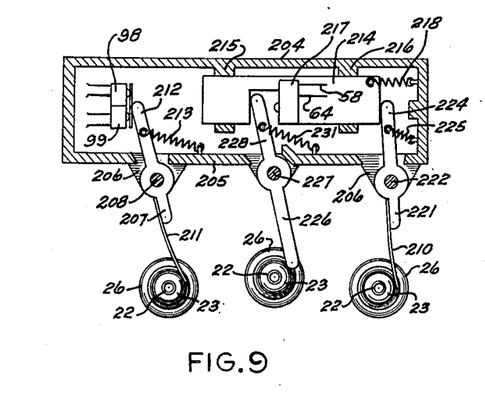

In FIGS. 8 and 9 we show alternate sensing apparatus enclosed in a control box 204. The box is provided with a wall 205 facing the side of the filler, the wall being provided with brackets 206 for the support of sensing fingers. Pulsing arm 207 (comparable to feeler arm 97 in the embodiment first described) is mounted on pivot 208 on the first bracket 206. Arm 207 is provided with a flexible finger extension 211 which extends into the path of filler tubes 22 and bell 23, the arm 211 being long enough to be actuated either by the bell or the tube. If the bell has descended by gravity the finger 211 will be actuated by the filler tube 22. Arm 207 is provided with a rearward extension 212 biased by spring 213 toward the right as shown in these figures. Each time a filler station passes the arm 211 the dual microswitches 98, 99 will be actuated for pulsing the various stepping relays.

It is clear that it is relatively immaterial from what source microswitches 98 and 99 are actuated provided only that they are actuated in time with the advance of bottles and that their actuation be interrupted when bottle advance is interrupted. Accordingly, switches 98, 99 could be actuated by apparatus entirely separate from the apparatus which discriminates between broken and unbroken bottles in the filler stations. However, for convenience and compactness the two embodiments shown in this application physically incorporate the pulsing switches in the same control boxes 67, 204 as the discriminating apparatus.

The discriminating apparatus consists of a mounting block 214 mounted for free longitudinal reciprocation on the brackets 215, 216. The block 214 carries a microswitch 217 which combines the functions of the series connected microswitches 59, 60 of the previous embodiment of the invention. This microswitch may be connected directly to the lines 58, 64 in the circuit of FIG. 10.

The block 214 is biased by means of tension spring 218 toward the right in these figures. The block 214 is in contact with rearward arm extension 224 of arm 221 pivoted to bracket 206 on pin 222. Arm 221 has a resilient finger 210 similar to finger 211 of arm 207. Accordingly, arm 221 is actuated each time a station passes to move the block 214, together with its switch 217 to the left. Arm 224 may be biased by tension spring 225 to return position.

If there is an unbroken bottle in the station opposite an intermediate arm 226, which is pivoted at 227 on bracket 206, as shown in FIG. 9, arm 226 will be engaged by bell 23 to oscillate about its pivot 227 to move its rearwardly extending arm 228 to the left in timed coordination with the movement of the block 214. Under these circumstances the switch 217 will not be actuated. However, if the bottle in the filler station is broken and the bell cap 23 has slipped downwardly, as suggested in FIG. 8, arm 226 will not be contacted by the bell cap and the spring 231 will hold arm 228 in the path of movement of switch 217 whereby to close the switch and trigger the memory circuits in the manner aforesaid. In this embodiment of the invention the sonar detector is relied on to discriminate between conditions in which there are no bottles in the device and in which a bottle smash has occurred, inasmuch as arm 221 is actuated regardless of the presence or absence of bottles in the machine.

When a single bottle is to be ejected by the operator, switch 230 is depressed momentarily when the bottle to be ejected is opposite the ejector box 108. When manual ejection of one bottle is to be followed by ejection of correspondingly located bottles in the second and third rotations of the turntable, this is done by closing switch 115 as above described, whereby the ejector and the second and third stepping relays are sequentially energized.

We claim:

1. A method of cleaning from a cyclically operating multi-station bottle handling machine such contaminating slivers of glass as are deposited on a particular station by breakage of a bottle positioned in said station, said method comprising the steps of detecting the contaminated station, feeding bottles to all stations of the machine in the course of its cyclic operation including a replacement bottle to the contaminated station and to which such contaminating slivers tend to be transferred in the course of machine operations at the contaminated station, automatically logging the number of bottles processed in the machine pursuant to said detection until the contaminated replacement bottle comes opposite an ejector, and automatically ejecting the contaminated replacement bottle from the normal path of the bottles in the machine.

2. The method of claim 1 plus the steps of feeding a succeeding replacement bottle to the contaminated station in the course of feeding bottles to all stations of the machine in its cyclic operation, automatically logging the bottles processed in the machine until the said succeeding replacement bottle comes opposite the ejector, and automatically ejecting the said succeeding replacement bottle from the normal path of the bottles in the machine.

3. The method of claim 1 in which the contaminated station is detected by sensing the bottles conveyed by the respective stations past a sensing station, and discriminating between normal and broken bottles in each station.

4. The method of claim 3 in which the detection step further includes discriminating between normal and broken bottles in response to the sound of a breaking bottle.

5. A method of cleaning from a cyclically operating multi-station bottle filling machine such contaminating slivers of glass as are deposited on a particular station by breakage of a bottle positioned in said station, said method comprising the steps of detecting the contaminated station, feeding bottles to all said stations of the machine in the course of cyclic operation thereof including a first replacement bottle to the contaminated station, filling the first replacement bottle at said station to tend to flush said glass slivers into said bottle, counting the bottles processed in the machine until the first replacement bottle passes an ejector station and ejecting the contaminated first replacement bottle from the normal path of the bottles in the machine.

6. The method of claim 5 in which the contaminated station is detected by sensing the bottles in the respective machine stations and discriminating between normal and broken bottles, the count of processed bottles being made with reference to the number of bottle spaces intervening between the contaminated station and the ejector, said count being made in timed coordination with the advance of bottles through the machine until the count equals the number of intervening spaces.

7. Apparatus adapted to clean from a cyclically operating multi-station bottle handling machine such contaminating slivers of glass as are deposited on a particular station by breakage of a bottle positioned in said station, said apparatus comprising an ejector, means for detecting the contaminated station, means for feeding bottles to all stations of the machine in the course of its cyclic operation including a replacement bottle to the contaminated station and to which the contaminating slivers of glass tend to be transferred in the course of machine operations, means for counting bottles processed in the machine after the contaminated station is detected and until the contaminated replacement bottle comes opposite the ejector, and means responsive to the completion of said count for actuating the ejector to eject the contaminated replacement bottle from the normal path of the bottles in the machine.

8. The device of claim 7 in which the means second mentioned includes means for feeding a second replacement bottle to the contaminated station in the course of feeding bottles to all stations of the machine in the cyclic operation thereof, and means for counting the bottles processed in the machine until the second replacement bottle comes opposite the ejector, and means responsive to the completion of said count for actuating the ejector to eject the second replacement bottle from the normal path of the bottles in the machine.

9. The device of claim 7 in further combination with means responsive to the detecting means for triggering the counting means, and means actuating the counting means in timed coordination with the advance of bottles through the machine in its cyclic operation.

10. The device of claim 7 in which said detecting means comprises means for sensing the bottles in the respective stations of the machine including means for discriminating between normal and broken bottles, and means for initiating action of the counting means in response to the detection by said sensing means of a broken bottle in a contaminated station.

11. The device of claim 10 in which said detecting means further comprises means responsive to the sound of a breaking bottle to precondition the discriminating means for operation.

12. Apparatus adapted to clean from a particular station of a cyclically operating multi-station bottle filling machine such contaminating slivers of glass as are deposited on said particular station by breakage of a bottle positioned in said station, said apparatus comprising an ejector, means for detecting the contaminated station, means for feeding bottles in the cyclic operation of the machine to all of the stations of the machine including a first replacement bottle fed to the contaminated station, means for filling the first replacement bottle at said station to tend to flush said glass slivers into said first replacement bottle, means responsive to said detecting means for counting the bottles processed in the machine until the cyclic operation of the first replacement bottle is opposite said ejector, and means responsive to said counting means for triggering said ejector to reject the contaminated first replacement bottle from the normal path of the bottles in the machine.

13. The device of claim 12 in which the detecting means is spaced a predetermined number of bottle spaces from the ejector, said detecting means comprising means for sensing the bottles in the respective machine stations and discriminating between normal and broken bottles, an indexing device, means for actuating said indexing device in time with bottle passage and means for triggering the ejector after the indexing device has been indexed a number of times equal to the number of bottle spaces between the contaminated station and the ejector.

14. Apparatus for detecting a station contaminated by broken glass on a multi-station cyclically operating bottle handling machine and ejecting a replacement bottle processed in said station, said apparatus comprising means for sensing bottles in machine stations and discriminating between stations containing normal bottles and broken bottles, electric memory means including an electric counter and means operatively connected to the counter for initiating action of the counter in response to detection of a contaminated station by the sensing means, ejecting means in the path of a replacement bottle processed in said contaminated station and spaced from said detecting means by a predetermined number of bottle spaces, means for the repeated actuation of the counter in step with the advance of a replacement bottle through said machine in the course of its cyclic operation, and means actuated when the replacement bottle is opposite the ejecting means for triggering the ejecting means to eject the replacement bottle from the normal path of the bottles in the machine.

15. The device of claim 14 in which the respective stations of said machine have corresponding elements, the means for sensing bottles in machine stations comprises a sensing arm extending into the path of normal bottles advanced by said stations past said arm, a switch actuated by movement of said arm depending on whether or not there is a bottle in the machine station opposite the arm, said means for repeated actuation of the counter in step with advance of the bottles comprising a feeler arm projecting into the path of such corrseponding elements at each station whereby the feeler arm will be actuated in step with the movement of stations past said arm.

16. The device of claim 15 in further combination with a sound detector and means controlled by said sound detector and connected to the counter whereby the sound of a breaking bottle will actuate said last mentioned means to precondition the counter for response to the sensing arm.

17. In a device of the character described and including a memory stepping relay and means to actuate said relay in response to the detection of a broken bottle in a particular station of a cyclically operating multi-station bottle handling machine, sensing means for detecting said particular station and comprising a feeler arm relatively movable with respect to said machine and extending toward said station to be normally cammed aside in the cyclic operation of the machine by the presence of a normal bottle therein, said arm remaining undisturbed on the passage of a machine station in which a bottle has been broken, the means to actuate said relay comprising a switch in circuit with the relay and actuated by said feeler arm.

18. The device of claim 17 in which each said station is provided with a filler stem and a filler bell cap slidable on said stem, said cam having substantial radial projection and being held by a normal bottle at the top of the stem in a position projecting into the path of the feeler arm, said bell cap descending by gravity on said stem to a lower position clear of the path of the feeler arm when its supporting bottle is broken, said bell cap constituting means to actuate the feeler arm when it is in uppermost position.

19. The device of claim 17 in combination with means for pulsing said memory stepping relay in response to the advance of bottles through said machine in the course of its cyclic operation and for a predetermined number of bottles, an ejector triggering circuit including an ejector actuating switch coupled to the stepping relay, said ejector actuating switch comprising means to close the bottle ejecting circuit concurrently with the last pulse of said predetermined number whereby to actuate said ejector when the replacement bottle comes opposite thereto.

20. In a device of the character described, an electric circuit and circuit components in said circuit for detecting a cyclically operating glass contaminated station on a multiple station bottle handling machine, a first stepping relay having control circuit means including a switch, detecting means for actuating the switch, means operatively connected to said first stepping relay for pulsing said first stepping relay through a predetermined number of steps in response to the advance of bottles through said machine in the course of its cyclic operation including a replacement bottle, means for ejecting the replacement bottle after the bottles have advanced a number of positions corresponding to the number of steps in the stepping relay, and circuit means actuated by the last step in the stepping relay for actuating the ejector means whereby to eject the replacement bottle.

21. The device of claim 20 in further combination with a plurality of additional stepping relays, said control circuit means further including a stepping relay selector switch having a plurality of contacts, circuit means connecting the respective stepping relays to respective contacts on the stepping relay selector switch to initially step said relays in response to actuation of the detecting means switch, said stepping relay selector switch comprising means to sequentially energize the respective stepping relays in response to bottle breakage in successive stations on the bottle handling machine, circuit means separately connecting each said stepping relay to said pulsing means, whereby each said relay will step through its predetermined fixed number of positions independently of the stepping action of the other relays after having initially been stepped by the stepping relay selector switch.

22. The device of claim 21 in further combination with a second stepping relay selector switch and a plurality of second stepping relays interconnected thereto and having means for triggering the ejector and means for actuating said second stepping relay selector switch in response to actuation of the ejector by any one of the first stepping relays.

23. In a device of the character described, the subcombination in a multiple station bottle handling machine of a memory circuit actuator comprising a feeler arm extending into the path of a bottle in said station and a switch actuated by the feeler arm to be actuated each time a normal bottle passes the feeler arm but which will not be actuated if the bottle is broken, in combination with a pulsing circuit actuator comprising a second feeler arm independent of said bottles extending into the path of successive stations on the machine, said second feeler arm being provided with a second switch successively opened and closed by actuation of the arm.

24. In a device of the character described, the subcombination in a multiple station bottle handling machine of a memory circuit actuator comprising a feeler arm extending into the path of a bottle in said station and a switch actuated by the feeler arm to be actuated each time a normal bottle passes the feeler arm but which will not be actuated if the bottle is broken, in further combination with a sonar detecting device responsive to the sound of a breaking bottle and having a switch in series circuit with the first mentioned switch whereby both said switches must be closed in order to actuate the memory circuit.

25. The device of claim 24 in which said sonar detecting device is bodily spaced from the feeler arm whereby to actuate its switch in advance of actuation of the arm switches, said sonar actuated switch comprising a time delay switch which will remain actuated until the arm switches are actuated.

26. The device of claim 23 in which said memory circuit actuator further comprising a third feeler arm extending toward said station at a lower level and into the path of bottles whereby to be actuated both by normal bottles and fragments of broken bottles, said third feeler arm being provided with a third switch in series with the first mentioned switch whereby closure of both said switches is a prerequisite to actuation of the memory circuit.

27. In a device of the character described, the combination in a movable multiple station bottle handling machine of a stepping relay actuator comprising a first feeler arm extending into the path of movement of bottles in the stations of said machine, said arm being actuated by normal bottles but not actuated if the bottle has been broken whereby to discriminate between stations containing normal and broken bottles, a switch mounted for bodily movement with respect to said arm, and means for moving said switch bodily in timed coordination with bottle advance, said movement being in such direction with respect to the movement of the arm whereby the arm will not actuate the switch when there is a normal bottle in the station and will actuate the switch when there is no bottle in the station.

28. The device of claim 27 in which said device further comprising a sliding block on which said switch is mounted and a second feeler arm extending into the path of movement of a part of the machine to be actuated thereby and communicate such movement to said block.

29. In a device of the character described, a bottle ejector mechanism comprising a bottle conveyor having bottle compartments and ejector pushers in said compartments, a cam rail adjacent the path of said conveyor, cam followers pivotally connected to said pushers for movement between first positions clear of said cam rail and second positions engaging said cam rail, and ejector means for selectively pivoting said cam followers about their pivots to their said second positions for engagement thereof with said cam rail whereby movement of said conveyor along said rail will actuate all ejector pushers having their cam followers engaged with the cam rail.

30. The device of claim 29 in further combination with means at the end of the cam rail to restore said cam followers to initial position pending reactuation by said ejector means.

References Cited in the file of this patent

UNITED STATES PATENTS

| | | |
|---|---|---|
| 1,348,341 | Winkley | Aug. 3, 1920 |
| 2,132,447 | Stout | Oct. 11, 1938 |
| 2,368,796 | Ardell | Feb. 6, 1945 |
| 2,579,404 | Stevenson | Dec. 18, 1951 |
| 2,635,746 | Gordon | Apr. 21, 1953 |
| 2,643,767 | Baker | June 30, 1953 |
| 2,732,896 | Lundahl | Jan. 31, 1956 |
| 2,873,855 | McCormick | Feb. 17, 1959 |

FOREIGN PATENTS

| | | |
|---|---|---|
| 629,065 | Germany | Apr. 22, 1936 |
| 682,303 | Great Britain | Nov. 5, 1952 |